United States Patent
Tang et al.

(10) Patent No.: US 12,385,253 B2
(45) Date of Patent: Aug. 12, 2025

(54) FABRIC-BACKED ROOFING MEMBRANE COMPOSITE

(71) Applicant: Holcim Technology Ltd, Zug (CH)

(72) Inventors: Jiansheng Tang, Westfield, IN (US); Michael J. Hubbard, Goshen, IN (US); Joseph Kalwara, Indianapolis, IN (US); Carl E. Watkins, Jr., Mount Juliet, TN (US); Brian Alexander, Westfield, IN (US); Todd D. Taykowski, Lebanon, TN (US); Joseph R. Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 18/491,904

(22) Filed: Oct. 23, 2023

(65) Prior Publication Data

US 2024/0060306 A1    Feb. 22, 2024

Related U.S. Application Data

(63) Continuation of application No. 16/088,175, filed as application No. PCT/US2017/024190 on Mar. 25, 2017, now abandoned.
(Continued)

(51) Int. Cl.
*E04D 5/14* (2006.01)
*B32B 5/02* (2006.01)
(Continued)

(52) U.S. Cl.
CPC .............. *E04D 5/148* (2013.01); *B32B 5/022* (2013.01); *B32B 5/24* (2013.01); *B32B 7/12* (2013.01); *B32B 25/04* (2013.01); *B32B 25/10* (2013.01); *B32B 27/06* (2013.01); *B32B 27/12* (2013.01); *B32B 27/32* (2013.01); *E04D 5/06* (2013.01); *E04D 5/08* (2013.01); *B32B 2262/0284* (2013.01); *B32B 2262/101* (2013.01); *B32B 2419/06* (2013.01)

(58) Field of Classification Search
None
See application file for complete search history.

(56) References Cited

U.S. PATENT DOCUMENTS

| 3,935,353 A | 1/1976 | Doerfling et al. |
| 4,032,491 A | 6/1977 | Schoenke |

(Continued)

FOREIGN PATENT DOCUMENTS

| CA | 2809955 A1 | 5/2013 |
| DE | 19945732 A1 | 4/2001 |

(Continued)

OTHER PUBLICATIONS

Translation of WO 2006108509 A1.
(Continued)

*Primary Examiner* — Michael N Orlando
*Assistant Examiner* — Abhishek A Patwardhan
(74) *Attorney, Agent, or Firm* — Renner, Kenner; Arthur M. Reginelli (57) ABSTRACT

A membrane composite comprising a membrane panel having opposed first and second planar surfaces and a fabric backing secured to a first planar surface through a UV-cured adhesive disposed on said planar surface of said membrane.

9 Claims, 4 Drawing Sheets

Related U.S. Application Data (60) Provisional application No. 62/313,225, filed on Mar. 25, 2016.

(51) Int. Cl.
*B32B 5/24* (2006.01)
*B32B 7/12* (2006.01)
*B32B 25/04* (2006.01)
*B32B 25/10* (2006.01)
*B32B 27/06* (2006.01)
*B32B 27/12* (2006.01)
*B32B 27/32* (2006.01)
*E04D 5/06* (2006.01)
*E04D 5/08* (2006.01)

(56) References Cited

U.S. PATENT DOCUMENTS

| | | |
|---|---|---|
| 4,404,243 A | 9/1983 | Terpay |
| 4,585,682 A | 4/1986 | Colarusso et al. |
| 4,657,958 A | 4/1987 | Fieldhouse et al. |
| 4,732,925 A | 3/1988 | Davis |
| 4,778,852 A | 10/1988 | Futamura |
| 4,806,400 A | 2/1989 | Sancaktar |
| 4,810,565 A | 3/1989 | Sancaktar |
| 4,908,229 A | 3/1990 | Kissel |
| 4,943,461 A | 7/1990 | Karim |
| 5,073,611 A | 12/1991 | Rehmer et al. |
| 5,086,088 A | 2/1992 | Kitano et al. |
| 5,128,386 A | 7/1992 | Rehmer et al. |
| 5,242,727 A | 9/1993 | Briddell et al. |
| 5,253,461 A | 10/1993 | Janoski et al. |
| 5,264,533 A | 11/1993 | Rehmer et al. |
| 5,317,035 A | 5/1994 | Jacoby et al. |
| 5,374,477 A | 12/1994 | Lawless et al. |
| 5,389,699 A | 2/1995 | Rehmer et al. |
| 5,389,715 A | 2/1995 | Davis et al. |
| 5,456,785 A | 10/1995 | Venable |
| 5,496,615 A | 3/1996 | Bartlett et al. |
| 5,573,092 A | 11/1996 | Gabilondo |
| 5,620,554 A * | 4/1997 | Venable ............ B65H 19/1852 156/499 |
| 5,665,822 A | 9/1997 | Bitler et al. |
| 5,686,179 A | 11/1997 | Cotsakis |
| 5,849,133 A | 12/1998 | Senderling et al. |
| 5,880,241 A | 3/1999 | Brookhart et al. |
| 5,891,563 A | 4/1999 | Letts |
| 5,895,301 A | 4/1999 | Porter et al. |
| RE36,674 E | 4/2000 | Gluck et al. |
| 6,044,604 A | 4/2000 | Clayton et al. |
| 6,080,818 A | 6/2000 | Thakker et al. |
| 6,117,375 A | 9/2000 | Garrett et al. |
| 6,120,869 A | 9/2000 | Cotsakis et al. |
| 6,184,496 B1 | 2/2001 | Pearce |
| 6,218,493 B1 | 4/2001 | Johnson et al. |
| 6,262,144 B1 | 7/2001 | Zhao et al. |
| 6,284,360 B1 | 9/2001 | Johnson |
| 6,297,324 B1 | 10/2001 | Briddell et al. |
| 6,299,936 B1 | 10/2001 | Reck et al. |
| 6,306,460 B1 | 10/2001 | Reck et al. |
| 6,310,163 B1 | 10/2001 | Brookhart et al. |
| 6,348,530 B1 | 2/2002 | Reck et al. |
| 6,355,701 B1 | 3/2002 | Soukup et al. |
| RE37,683 E | 4/2002 | Briddell et al. |
| 6,502,360 B2 | 1/2003 | Carr, III et al. |
| 6,569,970 B2 | 5/2003 | Reck et al. |
| 6,586,080 B1 | 7/2003 | Heifetz |
| 6,605,662 B2 | 8/2003 | Zhao et al. |
| 6,641,896 B2 | 11/2003 | Fensel et al. |
| 6,683,126 B2 | 1/2004 | Keller et al. |
| 6,720,399 B2 | 4/2004 | Husemann |
| 6,753,079 B2 | 6/2004 | Husemann |
| 6,764,733 B1 | 7/2004 | Clarke |
| 6,774,071 B2 | 8/2004 | Horner, Jr. et al. |
| 6,776,322 B2 | 8/2004 | Villela et al. |
| 6,790,520 B1 | 9/2004 | Todd et al. |
| 6,794,449 B2 | 9/2004 | Fisher |
| 6,813,866 B2 | 11/2004 | Naipawer, III |
| 6,828,020 B2 | 12/2004 | Fisher et al. |
| 6,831,114 B2 | 12/2004 | Husemann |
| 6,841,608 B1 | 1/2005 | Dreher et al. |
| 6,858,315 B2 | 2/2005 | Khan et al. |
| 6,863,944 B2 | 3/2005 | Naipawer, III et al. |
| 6,881,442 B2 | 4/2005 | Husemann |
| 6,887,917 B2 | 5/2005 | Yang et al. |
| 6,895,724 B2 | 5/2005 | Naipawer, III |
| 6,901,712 B2 | 6/2005 | Lionel |
| 7,066,371 B2 | 6/2006 | Villela et al. |
| 7,101,598 B2 | 9/2006 | Hubbard |
| 7,115,313 B2 | 10/2006 | Zanchetta et al. |
| 7,132,143 B2 | 11/2006 | Zanchetta et al. |
| 7,148,160 B2 | 12/2006 | Porter |
| 7,175,732 B2 | 2/2007 | Robison et al. |
| 7,238,732 B2 | 7/2007 | Bamborough et al. |
| 7,304,119 B2 | 12/2007 | Balzer |
| 7,323,242 B2 | 1/2008 | Gerst et al. |
| 7,358,319 B2 | 4/2008 | Balzer et al. |
| 7,368,155 B2 | 5/2008 | Larson et al. |
| 7,387,753 B2 | 6/2008 | Tackett et al. |
| 7,473,734 B2 | 1/2009 | Beckley et al. |
| 7,517,934 B2 | 4/2009 | Deeter et al. |
| 7,575,653 B2 | 8/2009 | Johnson et al. |
| 7,589,145 B2 | 9/2009 | Brant et al. |
| 7,612,120 B2 | 11/2009 | Letts |
| 7,614,194 B2 | 11/2009 | Shah |
| 7,645,829 B2 | 1/2010 | Tse et al. |
| 7,744,998 B2 | 6/2010 | Nakamuta |
| 7,771,807 B2 | 8/2010 | Hubbard |
| 7,776,417 B2 | 8/2010 | Mohseen et al. |
| 7,838,568 B2 | 11/2010 | Letts et al. |
| 7,914,868 B2 | 3/2011 | Naipawer, III et al. |
| 8,063,141 B2 | 11/2011 | Fisher |
| 8,153,220 B2 | 4/2012 | Nebesnak et al. |
| 8,202,596 B2 | 6/2012 | Yang et al. |
| 8,206,817 B2 | 6/2012 | Donovan et al. |
| 8,241,446 B2 | 8/2012 | Naipawer, III et al. |
| 8,262,833 B2 | 9/2012 | Dyal et al. |
| 8,327,594 B2 | 12/2012 | Merryman et al. |
| 8,329,800 B2 | 12/2012 | Terrenoire et al. |
| 8,381,450 B2 | 2/2013 | Cummings et al. |
| 8,389,103 B2 | 3/2013 | Kiik et al. |
| 8,399,571 B2 | 3/2013 | Becker et al. |
| 8,492,472 B2 | 7/2013 | Elizalde et al. |
| 8,530,582 B2 | 9/2013 | Becker et al. |
| 10,132,082 B2 | 11/2018 | Tang et al. |
| 10,370,854 B2 | 8/2019 | Tang et al. |
| 10,519,663 B2 | 12/2019 | Tang et al. |
| 2001/0023264 A1 | 9/2001 | Yamamoto |
| 2002/0013379 A1 | 1/2002 | Singh |
| 2003/0032351 A1 | 2/2003 | Horner, Jr. |
| 2003/0032691 A1 | 2/2003 | Bolte |
| 2003/0082365 A1 | 5/2003 | Geary |
| 2003/0153656 A1 | 8/2003 | Sjerps |
| 2003/0215594 A1 | 11/2003 | Hamdar |
| 2004/0103608 A1 | 6/2004 | Borenstein |
| 2004/0109983 A1 | 6/2004 | Rotter |
| 2004/0191508 A1 | 9/2004 | Hubbard |
| 2004/0242763 A1 | 12/2004 | Tielemans |
| 2005/0097857 A1* | 5/2005 | Mehta ............ E04D 12/002 52/782.1 |
| 2005/0214496 A1 | 9/2005 | Borenstein |
| 2006/0017974 A1 | 1/2006 | Shapovalov et al. |
| 2006/0100408 A1 | 5/2006 | Powell |
| 2006/0127627 A1 | 6/2006 | Larson et al. |
| 2006/0216523 A1 | 9/2006 | Takaki |
| 2007/0054088 A1 | 3/2007 | Matijasic et al. |
| 2007/0207284 A1 | 9/2007 | McClintic |
| 2007/0281119 A1 | 12/2007 | Di Stefano |
| 2008/0088056 A1 | 4/2008 | Vavra |
| 2010/0075092 A1 | 3/2010 | Kendra et al. |
| 2010/0086712 A1 | 4/2010 | Moller |
| 2010/0200148 A1 | 8/2010 | Douglas |
| 2010/0279049 A1 | 11/2010 | Hubbard |

(56) References Cited

U.S. PATENT DOCUMENTS

| | | |
|---|---|---|
| 2010/0292403 A1 | 11/2010 | Ansems |
| 2011/0048513 A1 | 3/2011 | Booth |
| 2011/0017391 A1 | 7/2011 | Franklin et al. |
| 2012/0240996 A1 | 9/2012 | Keiser |
| 2013/0122287 A1 | 5/2013 | Moeller |
| 2013/0184393 A1 | 7/2013 | Satrijo |
| 2013/0225020 A1 | 8/2013 | Flood |
| 2014/0215937 A1 | 8/2014 | Zhou et al. |
| 2015/0231863 A1* | 8/2015 | Knebel .................. B32B 5/022 428/355 R |
| 2016/0230392 A1 | 8/2016 | Tang et al. |
| 2017/0015083 A1 | 1/2017 | Tang et al. |
| 2017/0044406 A1 | 2/2017 | Hubbard et al. |
| 2017/0067257 A1 | 3/2017 | Zhou et al. |
| 2017/0096588 A1 | 4/2017 | Demoulin et al. |
| 2017/0114543 A1 | 4/2017 | Tang et al. |
| 2019/0316359 A1 | 10/2019 | Tang et al. |

FOREIGN PATENT DOCUMENTS

| | | |
|---|---|---|
| EP | 0342811 B1 | 7/1995 |
| EP | 1548080 B1 | 6/2005 |
| EP | 2439062 A1 | 4/2012 |
| GB | 2305667 A | 4/1997 |
| JP | 2004002577 | 1/2004 |
| JP | 2004003225 | 1/2004 |
| WO | 199856866 A1 | 12/1998 |
| WO | 199924290 A1 | 5/1999 |
| WO | 2006084134 A1 | 8/2006 |
| WO | 2006108509 A1 | 10/2006 |
| WO | 2013142562 A2 | 9/2013 |
| WO | WO-2015042258 A1 * | 3/2015 ............. B32B 25/04 |
| WO | 2015134889 A1 | 9/2015 |
| WO | 2017049280 A1 | 3/2017 |
| WO | 2017165868 A1 | 9/2017 |
| WO | 2017165870 A1 | 9/2017 |
| WO | 2017165871 A1 | 9/2017 |

OTHER PUBLICATIONS

Translation of JP 2004003225.
Translation of JP 2004002577.
Translation of EP 1548080 B1.
Translation of EP 2439062 A1.
European Standard EN 13956:2012.
Technical Datasheet of RoofSea/OneStep tape.
Technical Datasheet of Sika Sarnafil G410 SA Flashing Membrane.

* cited by examiner

FABRIC-BACKED ROOFING MEMBRANE COMPOSITE

This application is a continuation of U.S. application Ser. No. 16/088,175 filed on Sep. 25, 2018, which is a national-stage application of PCT/US2017/024190 filed on Mar. 25, 2017, which claims the benefit of U.S. provisional application No. 62/313,225 filed on Mar. 25, 2016, which are incorporated herein by reference.

FIELD OF THE INVENTION

Embodiments of the present invention are directed toward fabric-backed (also known as fleece-backed) roofing membranes wherein the fabric backing is adhesively secured to the membrane through a cross-linked adhesive that is applied to the membrane as a hot-melt.

BACKGROUND OF THE INVENTION

Flat or low-sloped roofs can be covered with polymeric membranes such as EPDM membranes. The membranes can be secured to the roof using several attachment mechanisms including ballasting, mechanical attachment, and adhesive attachment. Attachment of the membrane to the roof is important because the membranes can be subjected to severe wind uplift forces.

Adhesive attachment is typically employed to form adhered roofing systems. The membrane may be adhered to the roof substrate substantially across the entire planar surface of the membrane to form fully-adhered systems. Fully-adhered roofing systems are advantageously installed where maximum wind uplift prevention is desired. Also, fully-adhered systems are desirable in re-roofing situations, especially where the new membrane is placed over an existing membrane (a technique that is commonly referred to as re-skinning).

Several techniques are employed to prepare fully-adhered roofing systems. One technique includes the use of a fleece-backed EPDM membrane that is secured to the substrate by using a low-rise polyurethane foam adhesive that is sprayed over the substrate. Once the adhesive polyurethane foam is applied, the fleece-backed membrane is applied to the adhesive layer, which attaches itself to the fleece backing. Alternatively, nitrile-based bonding adhesive can be applied to the substrate and the fleece-backed EPDM membrane can be secured thereto.

While fleece-backed membranes typically offer superior wind-uplift resistance, which superiority stems from the strong adhesive bond formed between the fleece and the adhesive applied to the roof surface, a potential point of failure is the adhesion between the fleece and the membrane. In the case of thermoplastic membranes, the fleece is often attached to the membrane by heating or partially melting the membrane and mating the fleece to the membrane while in its molten or partially molten state. In a case of thermoset membranes, such as EPDM membranes, the fleece is often attached by employing a hot-melt adhesive. For example, it is common to employ ethylene vinyl acetate as an adhesive to secure the fleece to the membrane. In either event, extreme temperatures can negatively impact the adhesion between the fleece and the membrane. For example, in the case of ethylene vinyl acetate, as the membrane temperature nears the softening point of the ethylene vinyl acetate, the adhesive forces could be compromised.

SUMMARY OF THE INVENTION

One or more embodiments of the present invention provide a membrane composite comprising a membrane panel having opposed first and second planar surfaces and a fabric backing secured to a planar surface through a UV-cured adhesive disposed on said planar surface of said membrane.

Other embodiments of the present invention provide a method for preparing a membrane composite, said method comprising (i) providing a polymeric membrane having opposed planar surfaces, (ii) applying a curable adhesive onto a planar surface of the membrane to form a curable layer, (iii) curing the curable layer to formed a cured layer, (iv) applying a fabric to the cured layer.

DETAILED DESCRIPTION OF ILLUSTRATIVE EMBODIMENTS

Embodiments of the invention are based, at least in part, on the discovery of a roofing membrane composite including a fabric backing adhered to a polymeric membrane through a cross-linked adhesive that is applied to the membrane as a hot-melt. While the prior art employs holt-melt adhesives to secure fabric backing to membranes, use of the adhesive proposed by the present invention provides superior bond strength at elevated temperatures without compromising other attributes of the composite system.

Membrane Composite

Figure 1:
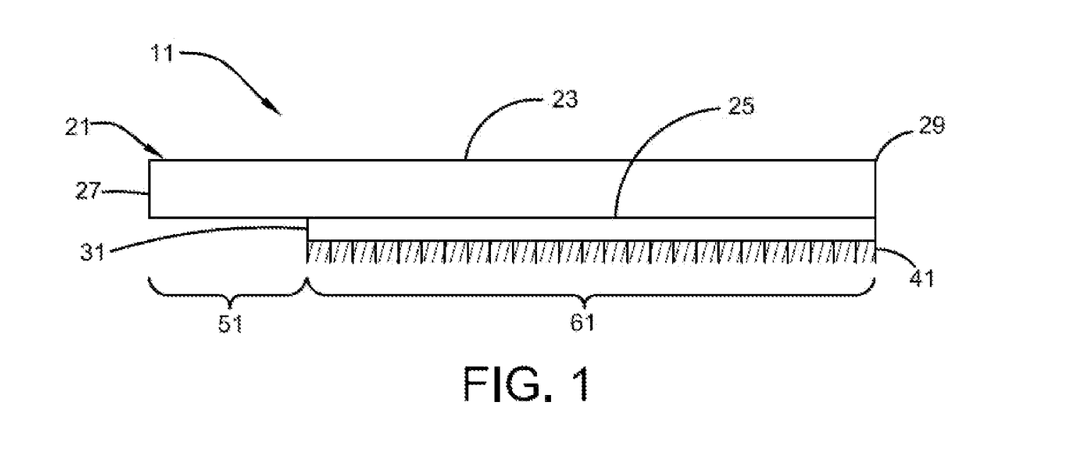
FIG. 1 is a cross-sectional side view of a fabric-backed roofing membrane composite according to aspects of the invention.

A membrane composite according to embodiments of the present invention can be described with reference to FIG. 1, which shows membrane composite 11 including polymeric planar body 21, adhesive layer 31, and fabric backing 41. Planar body 21 includes top planar surface 23, bottom planar surface 25, first lateral edge 27, and second lateral edge 29. Adhesive layer 31, which is a pressure-sensitive adhesive as described herein, is disposed on bottom planar surface 25 along at least a portion of the width of planar body 21. Fabric backing 41 is adhesively mated to planar body 21 through adhesive 31. As suggested in FIG. 1, the area of bottom surface 25 of planar body 21 carrying fabric backing 41 can be secured to a roof substrate through fabric backing 41, and therefore this area may be referred to as roof-surface contacting portion 61. That area of bottom surface 25 of planar body 21 that may be exposed (i.e. does not include adhesive 31 nor fabric backing 41) may be referred to as lap area 51.

Figure 2:
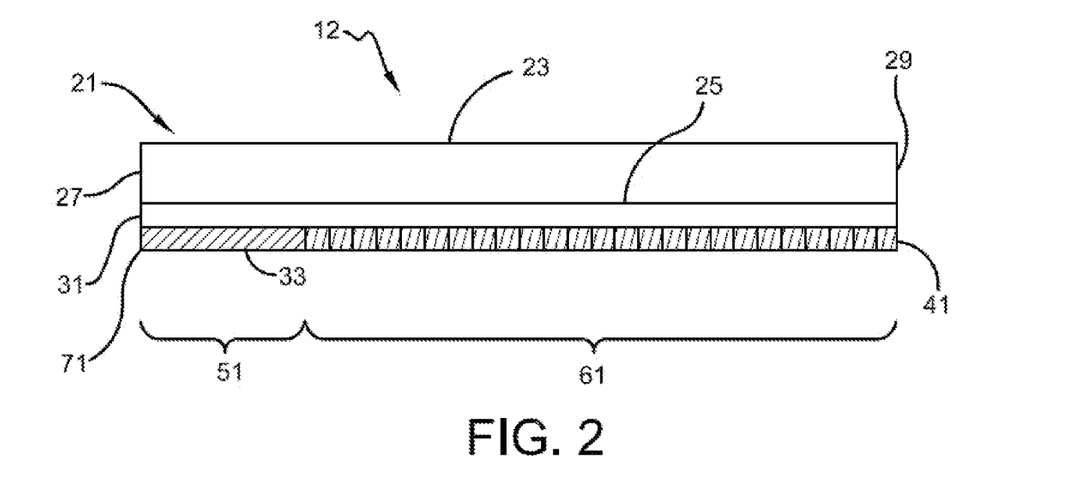
FIG. 2 is a cross-sectional side view of a roofing composite employed in alternate embodiments of the present invention.

An alternate embodiment of the membrane composites of the present invention may be described with reference to FIG. 2, which shows composite 12 including polymeric planar body 21, adhesive layer 31, which is a pressure-sensitive adhesive as described herein, fabric backing 41, and release member 71. Planar body 21 includes top planar surface 23, bottom planar surface 25, first lateral edge 27, and second lateral edge 29. Adhesive layer 31, which is a pressure-sensitive adhesive as described herein, is disposed on bottom planar surface 25 and extends the entire width of planar body 21 from first lateral edge 27 to second lateral edge 29. As with the embodiments in FIG. 1, fabric backing 41 partially extends across the width of planar body 21 thereby leaving exposed, at surface 33, a portion of adhesive layer 31. In lieu of fabric backing 41, a release member 71 may be removably affixed to adhesive layer 31 at surface 33. As a skilled person will appreciate, composite 12 can be secured to a roof substrate through fabric backing 41, and therefore this area of composite 12 may be referred to as roof-surface contacting portion 61. That portion of adhesive layer 31 represented by surface 33, and which may be covered with release member 71, can be employed to form a lap seal between overlapping, adjacent membranes.

Figure 3:
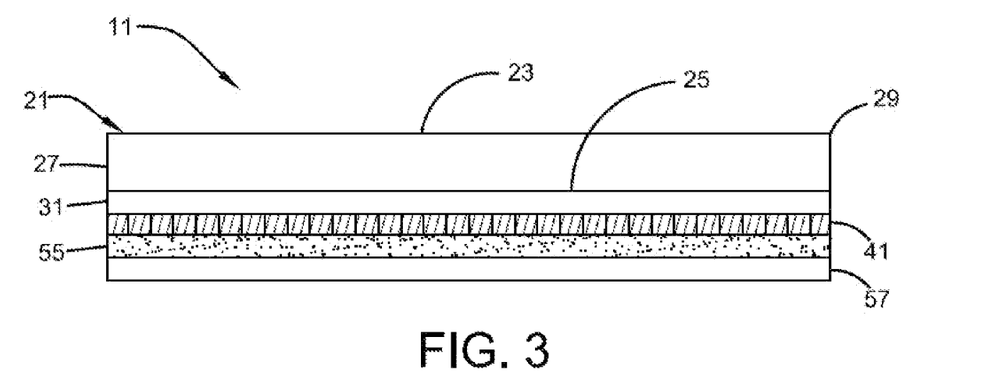
FIG. 3 is a cross-sectional of a side view of a roofing composite employed in alternate embodiments of the present invention.

An alternate embodiment of the membrane composites of the present invention may be described with reference to FIG. 3, which shows composite 13 including polymeric planar body 21, adhesive layer 31, which is a pressure-sensitive adhesive as described herein, fabric layer 41, external adhesive layer 55, and release member 57. Planar body 21 includes top planar surface 23, bottom planar surface 25, first lateral edge 27, and second lateral edge 29. Adhesive layer 31, which is a pressure-sensitive adhesive as described herein, is disposed on bottom planar surface 25 and extends the entire width of planar body 21 from first lateral edge 27 to second lateral edge 29. Fabric layer 41 is mated to adhesive layer 31 and can extend the entire width of planar body 21 from first lateral edge 27 to second lateral edge 29. External adhesive layer 55, which is a pressure-sensitive adhesive as described herein, is disposed on fabric layer 41 and extends the entire width of fabric layer 41 across the entire width of planar body 21 from first lateral edge 27 to second lateral edge 29. External adhesive layer 55 includes an outer surface, which is opposite fabric layer 41, to which release member 59 may be removably mated. According to one or more embodiments of the present invention, external adhesive layer 55 can be used to secure membrane composite 13 to a roof surface or adjoining membrane. Fabric layer 41 advantageously serves to provide impact strength and/or resistance to the composite, which will facilitate certain applications of the membrane composite, such as re-skinning procedures.

Uv-Curable Hot-Melt Pressure-Sensitive Adhesive

In one or more embodiments, the pressure-sensitive adhesive layer (e.g. layer 31 in FIG. 1 and FIG. 2) is a cured pressure-sensitive adhesive. In sub-embodiments thereof, this cured pressure-sensitive adhesive layer is formed from a curable hot-melt adhesive. In other words, and as will be described in greater detail below, an uncured adhesive composition is applied to the membrane as a hot-melt composition (i.e. the composition is heated and applied as a flowable composition in the absence or appreciable absence of solvent), and then the composition is subsequently cross-linked (i.e. cured) to form the cured pressure-sensitive layer.

In one or more embodiments, the cured pressure-sensitive adhesive layer may be an acrylic-based hot-melt adhesive. In one or more embodiments, the adhesive is a polyacrylate such as a polyacrylate elastomer. In one or more embodiments, useful polyacrylates include one or more units defined by the formula:

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a number average molecular weight of from about 90 to about 800 kg/mole, in other embodiments from about 100 to about 350 kg/mole, in other embodiments from about 100 to about 700 kg/mole, in other embodiments from about 150 to about 270 kg/mole, in other embodiments from about 120 to about 600 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 10,000 to about 200,000 cps, in other embodiments from about 30,000 to about 60,000 cps, in other embodiments from about 30,000 to about 170,000 cps, in other embodiments from about 25,000 to about 150,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacrylate). These polyacrylate elastomers may be formulated with photoinitiators, solvents, plasticizers, and resins such as natural and hydrocarbon resins. The skilled person can readily formulate a desirable adhesive composition. Useful adhesive compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the adhesive compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

As indicated above, the pressure-sensitive adhesive, in its cured stated, provides sufficient tack to allow the membrane composites of this invention to be used in roofing systems that meet industry standards for wind uplift resistance. In one or more embodiments, this tack may be quantified based upon the peel strength when adhered to another membrane in accordance with ASTM D-1876-08. In one or more embodiments, the cured pressure-sensitive adhesive of the present invention is characterized by a peel strength, according to ASTM D-1876-08, of at least 1.8 lbf/in, in other embodiments at least 3.6 lbf/in, in other embodiments at least 8.0 lbf/in, in other embodiments at least 15 lbf/in, and in other embodiments at least 20 lbf/in.

Similarly, the tack of the pressure-sensitive adhesive, in its cured state, may be quantified based upon the peel strength when adhered to a construction board (e.g. insulation board) having a kraft paper facer in accordance with ASTM D-903-98 (2010). In one or more embodiments, the cured pressure-sensitive adhesive of the present invention is characterized by a peel strength, according to ASTM D-903-98 (2010) using an insulation board with kraft paper facer, of at least 1.5 lbf/in, in other embodiments at least 2.0 lbf/in, in other embodiments at least 2.5 lbf/in, in other embodiments at least 3.0 lbf/in, and in other embodiments at least 3.5 lbf/in.

Release Member

In one or more embodiments, the release member (e.g. release member 71 and 57), which may also be referred to as a release member or release paper, may include a polymeric film or extrudate, or in other embodiments it may include a cellulosic substrate. In one or more embodiments, the polymeric film and/or cellulosic substrate can carry a coating or layer that allows the polymeric film and/or cellulosic substrate to be readily removed from the adhesive layer after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the adhesive layer.

In one or more embodiments, the release member is characterized by a thickness of from about 15 to about 80 μm, in other embodiments from about 18 to about 75 μm, and in other embodiments from about 20 to about 50 μm.

Thickness of Adhesive Layer

In one or more embodiments, the thickness of the pressure-sensitive adhesive layer (e.g. layer 31) may be at least 15 μm, in other embodiments at least 30 μm, in other embodiments at least 45 μm, and in other embodiments at least 60 μm. In these or other embodiments, the thickness of the pressure-sensitive adhesive layer may be at most 1000 μm, in other embodiments at most 600 μm, in other embodiments at most 300 μm, in other embodiments at most 150 μm, and in other embodiments at most 75 μm. In one or more embodiments, the thickness of the pressure-sensitive adhesive layer may be from about 15 μm to about 600 μm, in other embodiments from about 15 μm to about 1000 μm, in other embodiments from about 30 μm to about 300 μm, and in other embodiments from about 45 μm to about 150 μm.

Membrane Panel

In one or more embodiments, the membrane, which may be referred to as a panel (e.g. panel 21) may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 μm to about 3 mm, in other embodiments from about 1,000 μm to about 2.5 mm, and in other embodiments from about 1,500 μm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Fabric Backing

In one or more embodiments, the fabric backing (e.g. fabric backing 41) may include a synthetic fabric including glass or polymeric fibers or filaments. In particular embodiments, the fabric backing is a fleece, such as a napped fleece. Fleece backings of the type that are useful as fabric backings for roofing membranes are generally known in the art as described in U.S. Pat. Nos. 4,996,812, 5,422,179, 5,981,030, and 6,502,360 which are incorporated herein by reference.

In particular embodiments, the fabric backing is fleece prepared from polyester filaments such as those prepared from polyethylene terephthalate. In one or more embodiments, the fabric backing is a continuous filament polyester, needle punched, nonwoven fabric. In other embodiments, the fabric backing is a scrim reinforced nonwoven polyester mat. In yet other embodiments, the fabric backing is a glass fiber mat.

In one or more embodiments, where the fabric backing is a glass fiber mat, the fabric may be characterized by a basis weight of at least 50, in other embodiments at least 60, and in other embodiments at least 70 g/m². In these or other embodiments, the glass fiber mat may be characterized by a basis weight of at most 150, in other embodiments at most 130, and in other embodiments at most 100 g/m². In one or more embodiments, the glass fiber mat may be characterized by a basis weight of from about 50 to about 150 g/m², in other embodiments from about 60 to about 130 g/m², and in other embodiments from about 70 to about 110 g/m².

In one or more embodiments, where the fabric backing is a glass fiber mat, the glass mat may be characterized by a thickness of at least 0.5 mm, in other embodiments at least 0.7 mm, and in other embodiments at least 1.0 mm. In these or other embodiments, the glass mat may be characterized by a thickness of at most 2.0 mm, in other embodiments at most 1.5 mm, and in other embodiments at most 1.2 mm. In one or more embodiments, the glass mat may be characterized by a thickness of from about 0.5 to about 2.0 mm, in other embodiments from about 0.7 to about 1.5 mm, and in other embodiments from about 1.0 to about 1.2 mm.

In one or more embodiments, where the fabric backing is a polyester fleece, the fabric may be characterized by a basis weight of at least 70, in other embodiments at least 85, and in other embodiments at least 100 g/m². In these or other embodiments, the polyester fleece may be characterized by a basis weight of at most 400, in other embodiments at most 300, and in other embodiments at most 280 g/m². In one or more embodiments, the polyester fleece may be characterized by a basis weight of from about 70 to about 400 g/m², in other embodiments from about 85 to about 300 g/m², and in other embodiments from about 100 to about 280 g/m².

In one or more embodiments, where the fabric backing is a polyester fleece, the glass mat may be characterized by a thickness of at least 0.5 mm, in other embodiments at least 0.7 mm, and in other embodiments at least 1.0 mm. In these or other embodiments, the polyester fleece may be characterized by a thickness of at most 4.0 mm, in other embodiments at most 2.0 mm, and in other embodiments at most 1.5 mm. In one or more embodiments, the polyester fleece may be characterized by a thickness of from about 0.5 to about 4.0 mm, in other embodiments from about 0.7 to about 2.0 mm, and in other embodiments from about 1.0 to about 1.5 mm.

Preparation of Membrane Composite

The membrane panels employed in the membrane composites of the present invention may be prepared by conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference.

Once the membrane is formed, the curable hot-melt adhesive can be extruded onto the membrane by using known apparatus such as adhesive coaters. The adhesive can then subsequently be cured by using, for example, UV radiation. Once the adhesive has been sufficiently cured (e.g. by exposure to UV curing), a fabric backing can be applied to the cured coating, and then the composite can be wound into a roll for storage and shipment. Advantageously, where the membrane panel is made by using continuous techniques, the process can be supplemented with continuous techniques for applying and curing the adhesive coatings according to embodiments of the present invention to thereby prepare usable membrane composites within a single continuous process.

Figure 5:
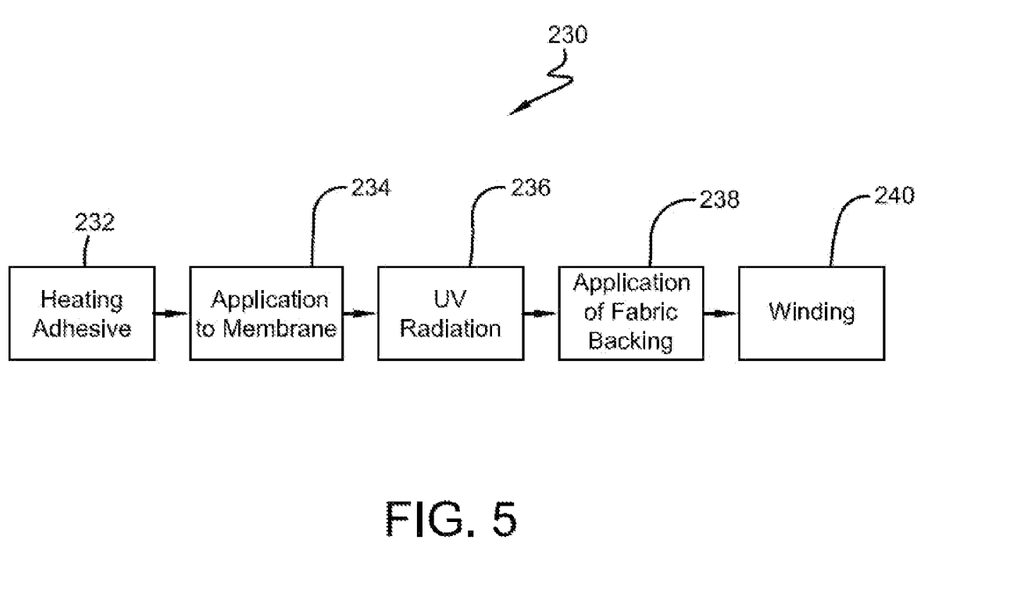
FIG. 5 is a flow chart describing a process for making membrane composite according to embodiments of the present invention.

As generally shown in FIG. 5, process 230 for preparing a composite membrane according to the present invention generally begins with a step of heating 232, wherein a pressure-sensitive adhesive is heated to a sufficient temperature to allow the adhesive to be applied as a coating within a coating step 234. Within coating step 234, the adhesive is applied to the membrane to form a coating layer. Following formation of the coating, the coating is subjected to a UV-curing step 236 where sufficient UV energy is applied to the coating to thereby effect a desirable curing or crosslinking of the adhesive. Once the adhesive has been sufficiently cured by exposure to UV curing step 236, a fabric backing can be applied to the cured coating in an application step 238. Following application of the fabric, the composite can be wound into a roll at winding step 240.

In one or more embodiments, heating step 232 heats the adhesive to a temperature of from about 120 to about 160° C., in other embodiments from about 125 to about 155° C., and in other embodiments from about 130 to about 150° C.

In one or more embodiments, adhesive step 234 applies an adhesive to the surface of a membrane to form an adhesive layer of adhesive that has a thickness of at least 51 μm (2 mil), in other embodiments at least 102 μm (4 mil), in other embodiments at least 127 μm (5 mil), and in other embodiments at least 152 μm (6 mil). In one or more embodiments, adhesive step 234 applies an adhesive to the surface of a membrane to form an adhesive layer of adhesive that has a thickness of from about 51 to about 381 μm (about 2 to about 15 mil), in other embodiments from about 102 to about 305 μm (about 4 to about 12 mil), and in other embodiments from about 127 to about 254 μm (about 5 to about 10 mil). In one or more embodiments, the adhesive has a uniform thickness such that the thickness of the adhesive at any given point on the surface of the membrane does not vary by more than 51 μm (2 mil), in other embodiments by more than 38 μm (1.5 mil), and in other embodiments by more than 25 μm (1 mil).

In one or more embodiments, UV curing step 236 subjects the adhesive to a UV dosage of from about 30 to about 380 millijoule/cm², in other embodiments from about 35 to about 300 millijoule/cm², in other embodiments from about 40 to about 280 millijoule/cm², in other embodiments from about 45 to about 240 millijoule/cm², and in other embodiments from about 48 to about 235 millijoule/cm². It has advantageously been discovered that the required dosage of energy can be exceeded without having a deleterious impact on the adhesives of the present invention. For example, up to ten times, in other embodiments up to five times, and in other embodiments up to three times the required dosage can be applied to the adhesive composition without having a deleterious impact on the adhesive composition and/or its use in the present invention.

In one or more embodiments, UV curing step 236 subjects the adhesive to a UV intensity, which may also be referred to as UV irradiance, of at least 150 milliWatts/cm², in other embodiments at least 200, and in other embodiments at least 250 milliWatts/cm². In these or other embodiments, UV curing step 236 subjects the adhesive to a UV intensity of from about 150 to about 500 milliWatts/cm², in other embodiments from about 200 to about 400 milliWatts/cm², and in other embodiments from about 250 to about 350 milliWatts/cm². It has advantageously been discovered that the ability to appropriately cure the adhesive compositions of the present invention, and thereby provide a useful pressure-sensitive adhesive for the roofing applications disclosed herein, critically relies on the UV intensity applied to the adhesive. It is believed that the thickness of the adhesives (and therefore the thickness of the pressure-sensitive adhesive layer) employed in the present invention necessitates the application of greater UV intensity.

In one or more embodiments, the energy supplied to the adhesive layer within UV radiation step 236 is in the form of UV-C electromagnetic radiation, which can be characterized by a wave length of from about 250 to about 260 nm. In one or more embodiments, the UV dosage applied during UV curing step 236 is regulated based upon a UV measuring and control system that operates in conjunction with UV curing step 236. According to this system, UV measurements are taken proximate to the surface of the adhesive layer using known equipment such as a UV radiometer. The data from these measurements can be automatically inputted into a central processing system that can process the information relative to desired dosage and/or cure states and automatically send signal to various variable-control systems that can manipulate one or more process parameters. For example, the power supplied to the UV lamps and/or the height at which the UV lamps are positioned above the adhesive layer can be manipulated automatically based upon electronic signal from the central processing unit. In other words, the UV intensity, and therefore the UV dosage, can be adjusted in real time during the manufacturing process.

In one or more embodiments, an exemplary process for preparing the membrane composites of the present invention can be described with reference to FIG. 6. Continuous process 250 includes a heating step 252 where UV-curable hot-melt adhesive 251 is heated to a desired temperature within a heated tank 253. Adhesive 251 is fed into an extrusion device, such as a coater 255, which may include a pump, such as a gear pump 257, and a slot die 259. Within coating step 254, coater 255 extrudes adhesive 251, which is in its molten, liquid or flowable state, and deposits a coating layer 261 of adhesive 251 onto a planar surface 263 of membrane 265.

Figure 6:
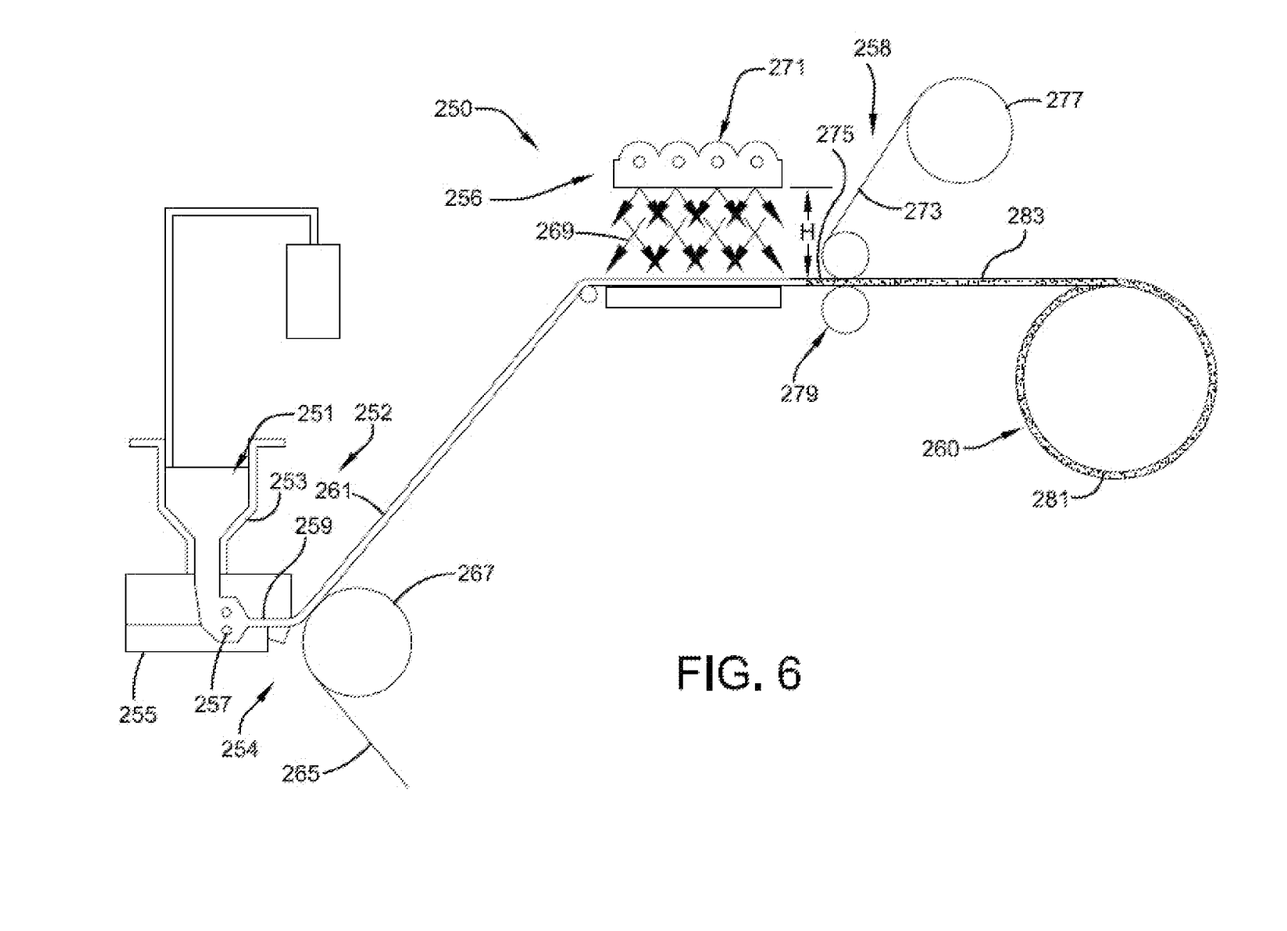
FIG. 6 is a schematic of a continuous process for making membrane composite according to the present invention.

As shown in FIG. 6, coating step 254 can include a roll-coating operation, where adhesive 251 is applied to membrane 265 while membrane 265 is at least partially wound around a coating mandrel 267. Membrane 265 carrying coating layer 261 is fed to a crosslinking step 256, where coating layer 261 of adhesive 251 is subjected to a desired dosage of UV radiation 269, which may be supplied by one or more UV lamps 271. UV lamps 271 may include, for example, mercury-type UV lamps or LED UV lamps. As the skilled person appreciates, the desired dosage of UV energy can be supplied to coating 261 by adjusting the UV intensity and exposure time. The intensity can be manipulated by the power supplied to the respective lamps and the height (H) that the lamps are placed above the surface of coating 261 of adhesive 251. Exposure time can be manipulated based upon the line speed (i.e., the speed at which membrane 265 carrying coating layer 261 is passed through UV curing step 256).

Following UV curing step 256, fabric 273 may be applied to upper surface 275 of coating layer 261 within fabric application step 258. As shown in FIG. 6, fabric 273 may be supplied from a mandrel 277 and mated to upper surface 275 through pressure supplied by nip rolls 279. After application of fabric 273, the composite product may be wound within winding step 260 to provide wound rolls 281 of composite products 283.

Installation of Membrane Composite

In one or more embodiments, the membrane composites of the present invention can be adhesively secured to a roof system (i.e. secured to an underlying roof substrate) by employing techniques well known in the art of securing fabric-backed roofing membranes. For example, a liquid-based adhesive can be applied to the roof surface and then the membrane composite can be unrolled onto the adhesive to contact the fabric backing to the adhesive. Various liquid-based adhesives can be employed including polyurethane, one-part and two-part adhesives (which are often foaming adhesives), as well as those bonding adhesives based upon polychloroprenes and neoprenes. Other adhesive systems include solvent-free bonding adhesive such as those polymeric systems that rely upon silicon functionalities for crosslinking. Exemplary solvent-free bonding systems include those described in U.S. Publ. No. 2016/0340905, which is incorporated herein by reference. Using conventional techniques, adjacent membranes are typically overlapped, and a lap seam is formed between overlapping membranes. In the case of thermoplastic membranes, the lap seam can be formed by heat welding. Alternatively, especially in the case of EPDM membranes, a lap seam can be formed by using a solid tape or liquid adhesive (e.g. butyl-based adhesive). In yet other embodiments, as suggested with respect to FIG. 2, the adhesives employed in the present invention for securing the fabric backing to the membrane can also be used in securing a seam between adjacent, overlapping membranes. In other embodiments, such as those described with reference to FIG. 3, the outer adhesive layer can be used, after exposing the layer by removal of the release liner, to secure the membrane composite to the roof deck and/or to adjacent membranes by employing standard peel-and-stick techniques.

Roof System

Figure 4:
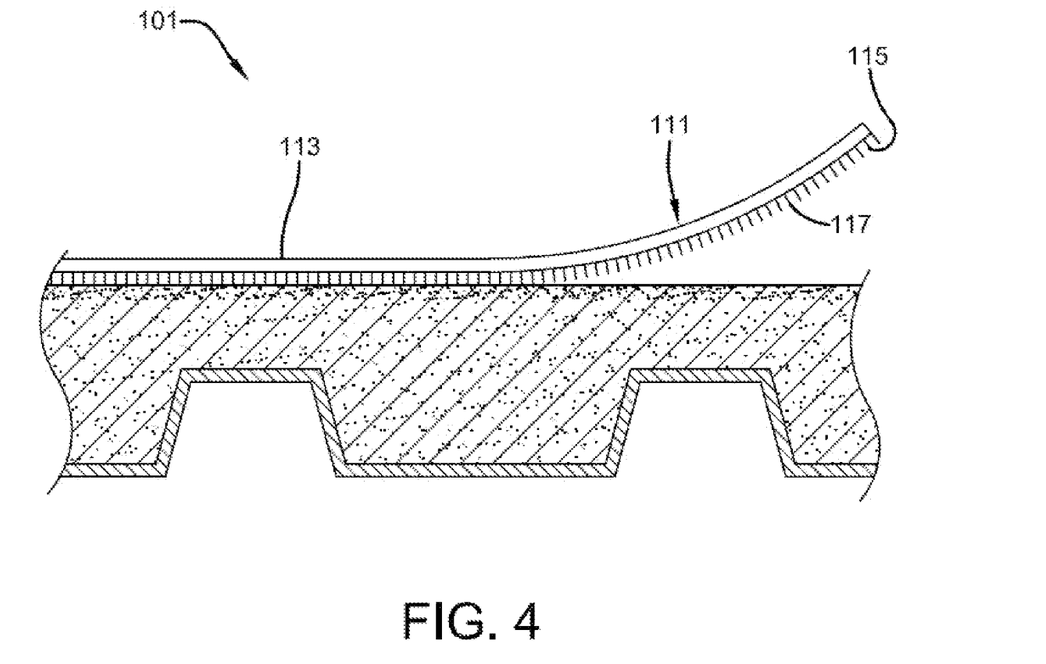
FIG. 4 is a cross-sectional side view of a roof system according to embodiments of the present invention.

A roof system according to embodiments of the present invention can be described with reference to FIG. 4, which shows roof system 101 including membrane composite 111, which includes planar body 113 and fabric backing 115 secured to planar body 113 through pressure-sensitive adhesive layer 117.

Various modifications and alterations that do not depart from the scope and spirit of this invention will become apparent to those skilled in the art. This invention is not to be duly limited to the illustrative embodiments set forth herein.

What is claimed is:

1. A method for preparing a membrane composite, the method comprising: (i) providing an EPDM roofing membrane panel having opposed first and second planar surfaces; (ii) providing a UV-curable polyacrylate composition, wherein the UV-curable polyacrylate includes monomeric units defined by the formula:

where each $R^1$ is individually hydrogen or a hydrocarbyl group and each $R^2$ is individually a hydrocarbyl group, where $R^2$ is an alkyl group having at least 4 carbon atoms; (iii) providing a fabric; (iv) applying the UV-curable polyacrylate composition to the first planar surface of the EPDM membrane to thereby form a laminate that includes a layer of UV-curable polyacrylate and a layer of EPDM roofing membrane panel; (v) subjecting the layer of UV-curable polyacrylate to UV radiation to thereby form a cured laminate that includes a layer of cured polyacrylate and a layer of EPDM roofing membrane panel, where the layer of cured polyacrylate is a pressure-sensitive adhesive; and (vi) mating the layer of fabric to the layer of cured polyacrylate to thereby form the membrane composite.

2. The method of claim 1, where the UV-curable polyacrylate consists essentially of monomeric units defined by the formula:

where each $R^1$ is individually hydrogen or a hydrocarbyl group and each $R^2$ is individually a hydrocarbyl group, where $R^2$ is an alkyl group having at least 4 carbon atoms.

3. The method of claim 1, where the UV-curable polyacrylate consists of monomeric units defined by the formula:

where each $R^1$ is individually hydrogen or a hydrocarbyl group and each $R^2$ is individually a hydrocarbyl group, where $R^2$ is an alkyl group having at least 4 carbon atoms.

4. The method of claim 1, where the fabric is a polyester fleece.

5. The method of claim 4, where the EPDM membrane panel meets the specifications of ASTM D-4637.

6. The method of claim 5, where the polyester fleece has a thickness of from about 0.5 to about 4.0 mm and a basis weight of at least 70 g/m².

7. The method of claim 1, where said step of applying includes applying the UV-curable polyacrylate composition across the entire width of the first planar surface of the membrane panel.

8. The method of claim 2, where $R^1$ is hydrogen and $R^2$ is selected from the group consisting of butyl, 2-ethylhexyl, and mixtures thereof.

9. The method of claim 8, where the polyacrylate is a copolymer including monomeric units of the formula where $R^2$ is butyl and monomeric units of the formula where $R^2$ is 2-ethylhexyl.

* * * * *